July 22, 1952 — M. HESS — 2,604,034
JUICE EXTRACTOR
Filed March 4, 1949
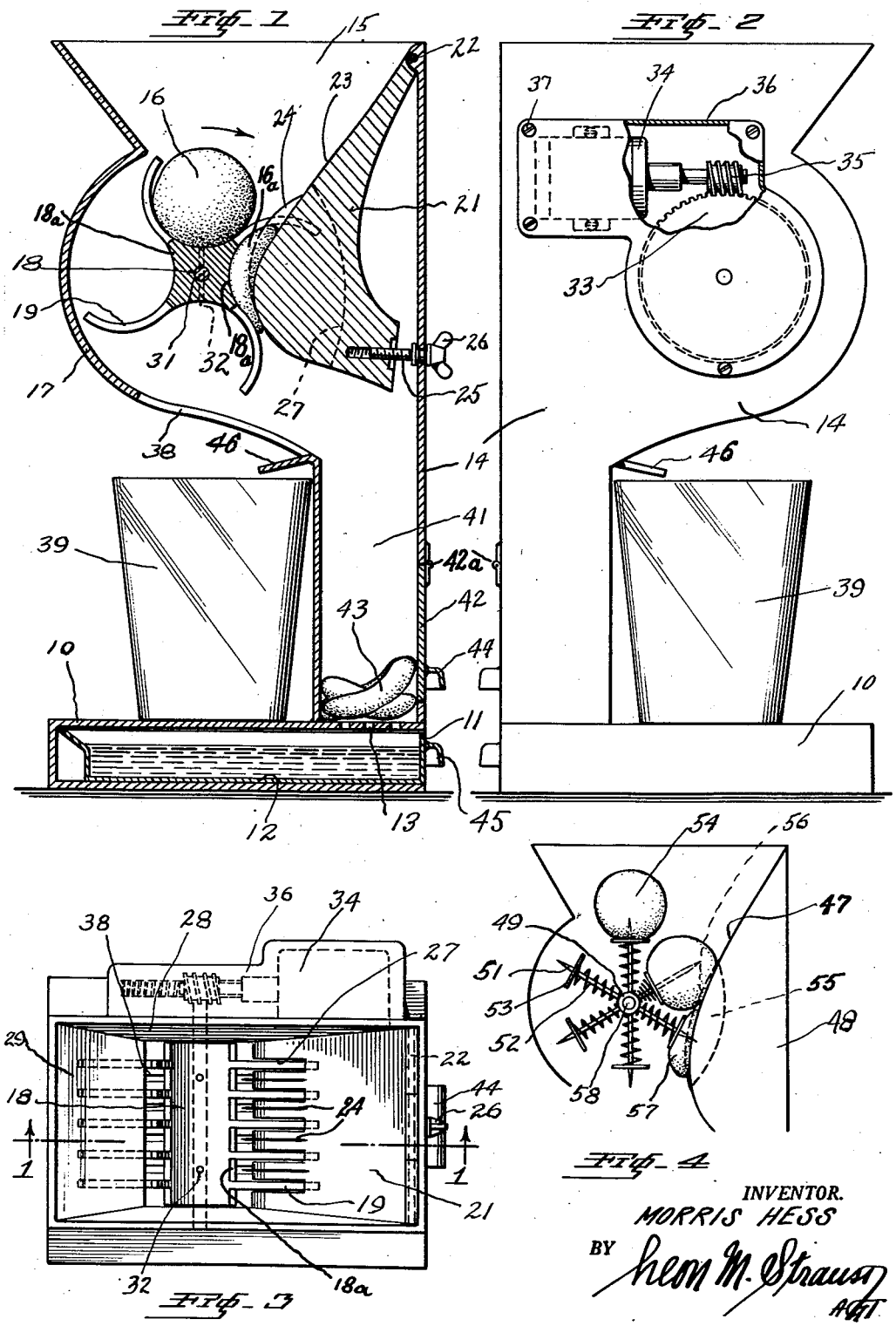
INVENTOR.
MORRIS HESS
BY Leon M. Strauss
AGT Patented July 22, 1952

2,604,034

UNITED STATES PATENT OFFICE 2,604,034

JUICE EXTRACTOR

Morris Hess, New York, N. Y., assignor of fifteen per cent to Max Kupfer, Bronx, N. Y.

Application March 4, 1949, Serial No. 79,597

1 Claim. (Cl. 100—98)

This invention relates to juice extractors or similar devices which may be used for removing and collecting juice from fruits, such as grapefruits, oranges, lemons, etc.

It is one of the objects of this invention to provide means affording an efficient and inexpensive juice extractor device which may be power-driven or hand-operated, and which is compact and sturdy in construction and necessitates only a relatively few parts.

It is a further object of this invention to provide means facilitating the supply of fruits without any preparation thereof into the extractor device in which the fruit is cut and squeezed automatically and the juice directed into the collector section.

Still another object of the invention is to provide means permitting the removal of waste material in a simple and labor-saving manner.

Yet a further object of the invention is to provide means rendering possible an adjustment of at least one of the squeezing parts or jaws in accordance with the size of the fruit to be squeezed.

Still a further object of the invention is to provide means ensuring ready accessibility to the parts to be cleaned so that the device will always be kept in a hygienic state.

Still another object of the present invention is to provide means for directing the fruits to a supply member which in cooperation with cutting and pressing means brings about a fully mechanical process of juice extraction and collection.

With the above and other objects in view, the invention will be hereinafter more particularly described and the combination and arrangement of parts will be shown in the accompanying drawing and pointed out in the claim which forms part of the specification.

In the drawing:

Fig. 1 is an elevational view in section of the juice extractor device made in accordance with this invention;

Fig. 2 is an end view of the device of Fig. 2 with parts broken away;

Fig. 3 is a top plan view of the device of Fig. 2;

Fig. 4 is a diagrammatic view of operative parts of a juice extractor and collector device in modified form.

Referring now particularly to Figs. 1, 2 and 3, 10 represents a hollow base which has an opening 11 at the rear thereof through which can be inserted or withdrawn a pan 12 adapted to receive drippings from the fruit through perforations 13.

Extending upwardly from the base 10 and rigidly fixed thereto is an upright hollow supporting structure 14 open at its upper end, as indicated at 15, to receive fruit 16. The structure is rounded at 17 to receive and permit the rotation of rotatable member or rotor 18 having radially extending and circumferentially spaced rows of concavely shaped projections 19 for receiving or carrying the orange or other fruit element 16 as the rotor 18 is rotated past the opening 15. The projections provide pockets for receiving and retaining the fruit elements and to positively carry them over and downwardly against a squeezer block 21. The squeezer block is pivoted at 22 to the upright structure 14 and hangs downwardly therefrom. The forward or fruit-engaging face of the block is rounded or concavely shaped, as indicated at 23. Beyond said face project from said block curved knife blades 24 for cutting through the skin and into the meat portions of the orange. An adjusting screw 25 can be turned from its wing nut handle 26 to move the block toward or away from the rotary member 18 in order to adapt the extractor to the different sizes of fruit to be squeezed. The block 21 has a series of slits 27 for receiving respectively the projections 19. The sides of the upright structure converge, as shown in Fig. 3 and as indicated at 28 and 29, to provide, along with the surface 23 of the block 21, a funnel-like opening for directing the fruit element to the rotary member and to prevent the engagement of more than one fruit element by the projections 19 as they move through the structure and toward the squeezer block 21.

The shaft 31 extends through the rotary member 18 and is fixed to it by pin 32. To the end of the shaft 31 is affixed a worm wheel 33. On the side of the upright structure is mounted an electric motor 34. This motor has a worm gear 35 in mesh with the worm wheel 33 to drive the shaft 31 and the conveyor or rotary member 18. A casing 36 is secured by screws 37 to one side of the upright structure or housing 14 and encloses the worm wheel 33, worm gear 35 and the motor 34. The motor 34 can be connected in conventional manner to a wall receptacle by means of an electric cord and plug (not shown). Instead of a motor, a hand-operated handle may be employed to rotate spider 18—19.

In the lower part of curved portion 17 are a series of openings, such as parallel slots 38 through which the juice from the cut and compressed fruit 16a passes to a tumbler 39 which may be placed on base 10.

In operation, the orange is taken by the projections 19 to the squeezer block where it is first cut by the knives 24. It is then drawn downwardly over the surface 23 of the block to gradually squeeze the fruit between block 21 and abutting portion 18a of rotatable member 18 to thereby compress the juice from the fruit. Continued rotation of the rotary member 18 finally causes pushing and freeing of the squeezed fruit from the block and subsequently dropping it (upon the lower curved portion 17) whence it will pass downwardly through discharge passageway or channel means 41. A swingable door 42 with hinge 42a is disposed at the rear of the structure 14 which can be lifted to effect the removal of the discarded and compressed fruits 43. A handle 44 is provided on door 42 to lift the same. At the lowermost end of the slots 38 and below the same there is a drain deflector or projection 46 to collect the juice which may not pass directly through the slots 38 and to direct a certain quantity of the juice to the tumbler 39.

Any remaining juice from compressed fruits will pass through the openings or perforations 13 of the base wall into the pan 12. The pan 12 has a spout and a handle 45 by which it can be removed from base 10. Any juice which does not pass to the tumbler 39 is thus collected in the pan 12.

It will be apparent that the device just described can be operated by hand, if desired, by means of a crank.

It is further apparent that additional knives may also be provided on the rotor 18 projecting beyond abutting base or hub portions 18a and clearing knife blades 24 on adjustable block 21.

In Fig. 4, there is shown a modified form of the invention wherein the oranges or other fruit elements are carried by the rotor in a different manner against the squeezer block which may be formed, as indicated at 47, as an integral part of upright structure 48. A rotor or conveyor 49 carries rows of pins 51 onto which the oranges or other fruits are impaled or strung singly. Each pin has a spring 52 surrounding it and this spring tends to urge outwardly a plate 53 which will tend to eject orange 54 from the pin after it is passed against squeezer block portion 47. The squeezer block has clearance slots 55 through which the pins pass. A series of spaced knives 56 cut the orange and as the rotor is moved past the squeezer block the orange will slide lengthwise of and onto the pins and compress to assume a shape indicated at 57. As the orange, which has been compressed, leaves the block and the pin extends downwardly, spring 52 and plate 53 will eject the squeezed orange from the pin and it will drop downwardly into an upright structure similar to the structure 14 of the above described embodiment of the invention. The rotor 49 is fixed to a shaft 58. This shaft can be driven by hand or by the same mechanism as above described. The cutting of the orange or fruit by the knives is made deeper and deeper as the orange is brought and drawn more and more over the surface of the squeezer block 55. The "drawing" press-and-cutting operation to which the fruit is being subjected is insufficient to cause a complete separation of the cut portions of the fruit so that the same will not be in a shredded condition when finally dropped into the waste collector 41.

Squeezer block 21 or 48 may be made of cast metal material, although it is also contemplated to manufacture the same from plastic or even rubber substance to thereby obtain a certain yieldability whereby the squeezer cheeks or jaws 21 and 18a may conform to each other while the "drawing" squeeze takes place on the fruit.

While various changes may be made in the detail construction, it shall be understood that such changes shall be within the spirit and scope of the present invention as defined by the appended claim.

Having thus described the invention, what is claimed as new and desired to be secured by Letters Patent, is:

A juice extracting device comprising a hollow housing having a funnel portion through which fruit is supplied to the interior of said housing, a spider-shaped conveyor including arms for said fruit rotatably arranged below said funnel portion within the interior of said housing, a concavely shaped squeezer block opposite said conveyor and provided with slits disposed in the path of said conveyor arms to provide pasageways for the latter, knife means fixed to said squeezer block and arranged to extend between said slits in said squeezer block and adapted to split said fruit open while said conveyor arms pass through said slits of said squeezer block during juice extracting operation, hinge means connecting the squeezer block to said housing, adjustable means arranged to move said block about said hinge means relative to said conveyor whereby fruit elements of different sizes can be passed through the extracting device, said hollow housing having a wall extending beneath said conveyor and provided with at least one slot, a base beneath said wall and adapted to support a tumbler vessel for collecting the juice which is extracted from the fruit and passes through said one slot of said wall, and channel means including a base wall provided with perforations and positioned below said block and adapted to retain said fruit and to separate same from any juice passing through said perforations of said base wall.

MORRIS HESS.

REFERENCES CITED

The following references are of record in the file of this patent:

UNITED STATES PATENTS

| Number | Name | Date |
| --- | --- | --- |
| 236,178 | Rice | Jan. 4, 1881 |
| 592,652 | Leigh | Oct. 26, 1897 |
| 808,861 | Mosteller | Jan. 2, 1906 |
| 818,725 | Williams | Apr. 24, 1906 |
| 917,849 | Couch | Apr. 13, 1909 |
| 919,499 | Ulery | Apr. 27, 1909 |
| 1,104,937 | Schiffmann | July 28, 1914 |
| 1,431,718 | Blum | Oct. 10, 1922 |
| 2,382,620 | Eastman | Aug. 14, 1945 |
| 2,479,194 | Eastman | Aug. 16, 1949 |